(12) United States Patent
Karrie et al.

(10) Patent No.: US 8,627,907 B2
(45) Date of Patent: Jan. 14, 2014

(54) STEERING DRIVE SYSTEM AND SKID STEER VEHICLE EQUIPPED THEREWITH

(75) Inventors: Jörg-Peter Karrie, Türkheim (DE); Nikolaus Müller, München (DE); Dieter Schwarz, Augsburg (DE)

(73) Assignee: Renk Aktiengesellschaft, Augsburg (DE)

( * ) Notice: Subject to any disclaimer, the term of this patent is extended or adjusted under 35 U.S.C. 154(b) by 0 days.

(21) Appl. No.: 13/319,268

(22) PCT Filed: Dec. 8, 2009

(86) PCT No.: PCT/DE2009/050068
§ 371 (c)(1),
(2), (4) Date: Apr. 27, 2012

(87) PCT Pub. No.: WO2010/115387
PCT Pub. Date: Oct. 14, 2010

(65) Prior Publication Data
US 2012/0205167 A1  Aug. 16, 2012

(30) Foreign Application Priority Data
Apr. 7, 2009  (DE) .......................... 10 2009 016 639

(51) Int. Cl.
*B62D 11/02*  (2006.01)
(52) U.S. Cl.
USPC ......... 180/6.48; 180/6.54; 180/6.58; 180/6.7; 180/9.1; 180/9.44; 180/243; 180/65.235

(58) Field of Classification Search
USPC .............. 180/6.48, 6.54, 6.58, 6.7, 9.1, 9.44, 180/243, 65.235
See application file for complete search history.

(56) References Cited

U.S. PATENT DOCUMENTS

| | | | |
|---|---|---|---|
| 4,497,218 A * | 2/1985 | Zaunberger | 475/18 |
| 4,960,404 A * | 10/1990 | Reppert et al. | 475/23 |
| 4,998,591 A * | 3/1991 | Zaunberger | 180/6.44 |
| 2010/0113213 A1* | 5/2010 | Oba et al. | 477/5 |
| 2011/0186361 A1* | 8/2011 | Dabbs et al. | 180/6.48 |

FOREIGN PATENT DOCUMENTS

DE  19 29 380  12/1980

* cited by examiner

*Primary Examiner* — Tashiana Adams
*Assistant Examiner* — Marlon Arce
(74) *Attorney, Agent, or Firm* — Cozen O'Connor

(57) ABSTRACT

A steering drive system includes a drive arrangement having a first drive and a second drive, a summing gear unit for summing driving torques of the drives on an output shaft of the summing gear unit, a first drive connection device by which the first drive is drivingly connected to a first input shaft of the summing gear unit, and a second drive connection device by which the second drive is drivingly connected to a second input shaft of the summing gear unit. The two drive connection devices are arranged in each instance such that no driving torque directed to the drives from the summing gear unit can be transmitted to the drives during a continuously produced drive connection between the drives and the summing gear unit.

12 Claims, 1 Drawing Sheet

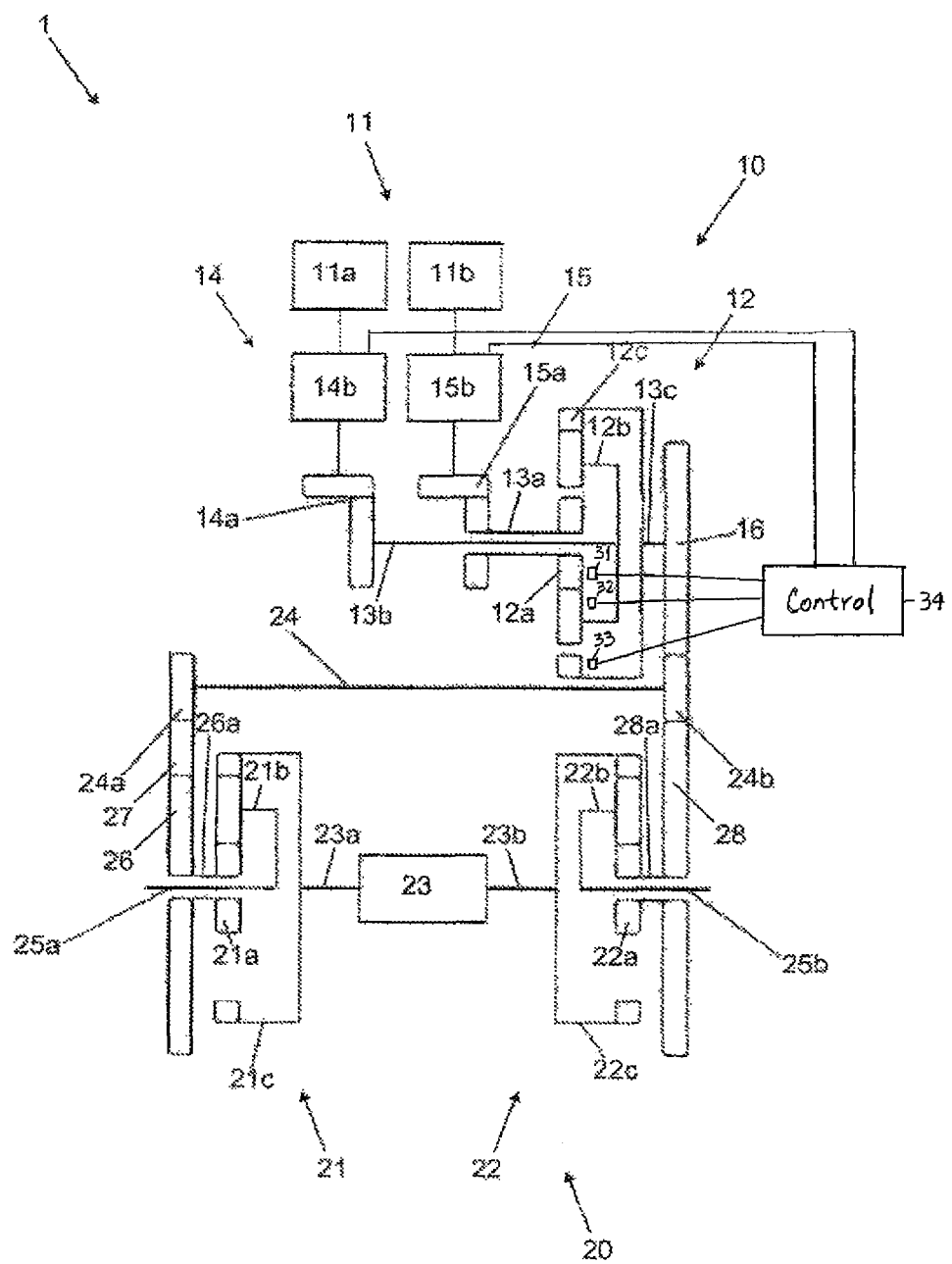

STEERING DRIVE SYSTEM AND SKID STEER VEHICLE EQUIPPED THEREWITH

CROSS-REFERENCE TO RELATED APPLICATIONS

This is a U.S. national stage of application No. PCT/DE2009/050068 filed 8 Dec. 2009. Priority is claimed on German Application No. 10 2009 016 639.4 filed 7 Apr. 2009, the content of which is incorporated herein by reference in its entirety.

BACKGROUND OF THE INVENTION

1. Field of the Invention

The invention is directed to a steering drive system for a skid steer vehicle and a skid steer vehicle, for example, a tracked vehicle, outfitted therewith.

2. Description of the Related Art

Steering drive systems for skid steer vehicles in which a steering speed is superimposed on a translational traction drive for the vehicle are known from the prior art. Of these, diverse configurations are known which either use an independent drive for each wheel side of the skid steer vehicle or in which traction drives are superimposed via a central drive unit using differentials.

Examples of steering drive systems of this kind are described in DE 24 46 727 A1 and DE 2 009 255 A1.

Multi-circuit steering drive systems or steering drive systems offering steering drive redundancy are not currently known. Yet existing steering drive systems have the disadvantage that they cannot ensure a precise or unimpaired steerability of the vehicle in case of failure of a steering drive.

A very high expenditure on dimensioning, electronics and software is required in order to make cascaded electrical systems reliable in terms of system technology. Because of the large expenditure, it has not been possible heretofore to integrate any of these electric drives on a large scale in vehicles having a design-dependent maximum speed of over 52 km/h.

SUMMARY OF THE INVENTION

It is an object of the invention to provide a steering drive system, particularly a superposition steering drive system, for a skid steer vehicle, wherein the steering drive system ensures a precise emergency steering of the vehicle. The invention has the further object of providing a skid steer vehicle, particularly a tracked vehicle, which is outfitted with a steering drive system of this kind.

According to a first aspect of the invention, a steering drive system, particularly a superposition steering drive system, is provided for a skid steer vehicle, wherein the steering drive system has: a drive arrangement having a first drive and a second drive which are constructed as separate units, a summing gear unit for summing respective driving torques of the two drives on an output shaft of the summing gear unit, a first drive connection device by means of which the first drive is drivingly connected to a first input shaft of the summing gear unit, and a second drive connection device by means of which the second drive is drivingly connected to a second input shaft of the summing gear unit, wherein the two drive connection devices are arranged in each instance such that no driving torque or back driving torque directed to the drives from the summing gear unit can be transmitted to the drives during a continuously produced drive connection between the drives and the summing gear unit.

Due to the fact that the invention provides two drives, particularly two drives which can be operated simultaneously, whose driving torques are summed by the summing gear unit on a common output shaft, then in the event of failure of one of the drives an emergency steering can be guaranteed by the other respective drive. In case of failure of a drive, a loss of torque for the drive remaining in operation owing to back driving on the inoperative drive is reliably prevented because no driving torque directed to the drives from the summing gear unit can be transmitted to the drives.

In cascaded multi-circuit steering, the drives would have to be overdimensioned. The solution suggested by the invention eliminates this problem through the gear ratio conditions in the summing gear unit. To turn (steer) a skid steer vehicle, a minimum turning torque is required. If there were two cascaded steering drives, for example, then in the event of failure of one drive the drive that is still functioning must apply twice the amount of torque to generate the required turning torque. In the solution according to the invention, the summing gear unit assists the still functioning drive while the second input shaft is inoperative and therefore makes the required turning torque available.

According to an embodiment form of the invention, the first drive and the second drive can be operable independently from one another by means of separate and mutually independent power sources such as, e.g., separate batteries or fuel cells in drives constructed as electric motors or, e.g., separate fuel tanks in drives constructed as combustion engines.

Accordingly, in an advantageous manner the operating reliability and the emergency steering function of the steering drive system are improved even more.

According to an embodiment form of the steering drive system according to the invention, the two drive connection devices are self-locking for driving torques directed from the summing gear unit to the drives.

This embodiment of the steering drive system according to the invention can be realized in a particularly simple and therefore economical manner. Further, a steering drive system designed in this way is especially operationally reliable and resistant to failure because the self-locking is triggered without separate signaling or actuating elements whenever driving torque or back drive torque is directed to the drives.

According to embodiment forms of the steering drive system according to the invention, the two drive connection devices each have toothed elements and/or a worm drive and/or a screw drive and/or an epicyclic gear unit.

These embodiments of the steering drive system according to the invention represent additional configurations which can be realized in a simple and therefore economical manner and which are resistant to failure.

According to an embodiment form of the steering drive system according to the invention, the first drive connection device has a first braking device which is arranged to firmly brake a drivetrain of the first drive, the second drive connection device has a second braking device which is arranged to firmly brake a drivetrain of the second drive, and speed detection means are provided for detecting respective driving speeds of the two drives, wherein the braking devices are each arranged to be selectively activated based on the driving speeds of the two drives and a differential speed determined therefrom.

The features according to this embodiment of the invention can be provided additionally or alternatively. The respective braking devices provide an alternative to, or redundancy of, the self-locking which can be controlled and integrated in a simple manner and which is therefore likewise economical. The speed detection means, e.g., contact-based or noncontacting speed sensors, are preferably arranged in the summing gear unit. Further, an electronic control unit can be provided which evaluates speed signals of the speed sensors and determines the differential speed and which is signal-coupled to the braking devices for controlling the latter (switching it on and off).

According to yet another embodiment form of the steering drive system according to the invention, the summing gear unit is a planetary gear unit.

This embodiment of the summing gear unit provides a technologically proven and reliable possibility for summing two drive outputs. Since there are many commercially available variants of planetary gear units, even standard gear units can be used if required, which further reduces costs and improves service-friendliness, particular with respect to repair times.

The first input shaft of the summing gear unit is preferably drivingly connected directly to a planet carrier of the summing gear unit, the second input shaft of the summing gear unit is drivingly connected directly to a sun gear of the summing gear unit, and the output shaft of the summing gear unit is drivingly connected directly to a ring gear of the summing gear unit.

According to a second aspect of the invention, a skid steer vehicle is provided, particularly a tracked vehicle, which has a steering drive system according to one or more or all of the embodiment forms according to the invention in any conceivable combination and a first steering differential, a second steering differential, a prime mover for realizing a translational drive of the vehicle, and a clutch element, wherein the prime mover is drivingly connected to both steering differentials, and wherein the clutch element is drivingly connected to both steering differentials and also to the output shaft of the summing gear unit.

The steering differentials and the steering drive system preferably work together in such a way that the clutch element behaves in a neutral manner when the vehicle travels in a straight line, wherein the clutch element is preferably formed by a neutral shaft or zero shaft, and the steering differentials are preferably formed by a planetary gear unit, wherein the zero shaft is stationary when the vehicle drives in a straight line.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in more detail in the following with reference to preferred embodiment forms and the accompanying drawings.

FIG. 1 is a schematic view of a steering drive system of a skid steer vehicle according to the invention.

DETAILED DESCRIPTION OF THE PREFERRED EMBODIMENTS

FIG. 1 shows a schematic view of a driving and steering system 1 of a skid steer vehicle (not shown in its entirety and not designated separately) constructed in the form of a tracked vehicle according to embodiment forms of the invention.

The skid steer vehicle has a steering drive system 10 and a traction drive system 20, wherein the steering drive system 10 is in a drive connection with the traction drive system 20 to influence the traction drive system 20.

The steering drive system 10 has a drive arrangement 11 having a first drive 11a and a second drive 11b, a summing gear unit 12 constructed as a planetary gear unit or epicyclic gear unit for summing respective driving torques of the two drives 11a, 11b on an output shaft 13c of the summing gear unit 12, a first drive connection device 14 by means of which the first drive 11a is drivingly connected to a first input shaft 13b of the summing gear unit 12, and a second drive connection device 15 by means of which the second drive 11b is drivingly connected to a second input shaft 13a of the summing gear unit 12.

The first input shaft 13b of the summing gear unit 12 is drivingly connected directly to a planet carrier 12b of the summing gear unit 12, the second input shaft 13a of the summing gear unit 12 is drivingly connected directly to a sun gear 12a of the summing gear unit 12, and the output shaft 13c of the summing gear unit 12 is drivingly connected directly to a ring gear 12c of the summing gear unit 12.

According to embodiment forms of the invention, the first drive 11a and the second drive 11b are formed, e.g., by an electric motor or a hydraulic motor.

The two drive connection devices 14, 15 are each arranged such that during a continuously produced drive connection (i.e., without the respective drives 11a, 11b being severed or decoupled from the summing gear unit) between the drives 11a, 11b and the summing gear unit 12, no driving torque directed to the drives 11a, 11b from the summing gear unit 12 can be transmitted to the drives 11a, 11b.

More specifically, the first drive connection device 14 has toothed elements in the form of a self-locking worm drive 14a and a first braking device 14b which is arranged in a drivetrain of the first drive 11a and in front of the worm drive 14a so that the first braking device 14b when correspondingly controlled can firmly brake the drivetrain of the first drive 11a.

Similarly, the second drive connection device 15 has toothed elements in the form of a self-locking worm drive 15a and a second braking device 15b which is arranged in a drivetrain of the second drive 11b and in front of the worm drive 15a so that the second braking device 15b can firmly brake the drivetrain of the second drive 11b when controlled in a corresponding manner.

Further, the steering drive system 10 has speed detection units 31, 32, 33 in the summing gear unit in the form of non-contacting speed sensors for detecting respective driving speeds of the two drives. Further, the steering drive system 10 has an electronic control unit 34 which evaluates speed signals of the speed sensors and determines a differential speed therebetween; the control unit is signal-coupled via signal lines, not shown, to the braking devices 14b, 15b for controlling (switching on/switching off) the latter.

The control unit is configured by hardware and/or software to selectively activate the braking devices 14b, 15b based on their driving speeds and the differential speed so that if one of the drives 11a, 11b fails, its associated braking device 14b or 15b is automatically activated or braked.

The traction drive system 20 has a first steering differential 21 constructed in the form of a planetary gear unit or epicyclic gear unit, a second steering differential 22 constructed in the form of a planetary gear unit or epicyclic gear unit, a prime mover 23, e.g., in the form of a combustion engine or hydraulic motor, for realizing a translational drive of the vehicle, and a clutch element 24 constructed as a zero shaft.

The prime mover 23 is drivingly connected via first input shafts 23a and 23b, respectively, directly to ring gears 21c and 22c, respectively, of the two steering differentials 21, 22. Respective planet carriers 21b and 22b of the two steering differentials 21, 22 are drivingly connected directly to a first driven shaft 25a and a second driven shaft 25b, respectively, for the translational traction drive.

A sun gear 21a of the first steering differential 21 is drivingly connected via a second input shaft 26a of the first steering differential 21 and via two toothed wheels 26, 27 to a first toothed wheel 24a which is connected to the clutch element 24 so as to be fixed with respect to rotation relative to it. A sun gear 22a of the second steering differential 22 is drivingly connected via a second input shaft 28a of the second steering differential 22 and via a toothed wheel 28 to a second toothed wheel 24b which is connected to the clutch element 24 so as to be fixed with respect to rotation relative to it.

The second toothed wheel 24b which is connected to the clutch element 24 so as to be fixed with respect to rotation relative to it drivingly engages with a toothed wheel 16 which is connected to the output shaft 13c of the summing gear unit 12 so as to be fixed with respect to rotation relative to it.

Although not depicted in this way in FIG. 1, the braking devices 14b, 15b, the speed detection means and the electronic control unit can also be omitted according to embodiment forms of the invention.

The operation of the multi-circuit steering system according to embodiment forms of the invention will now be described referring to FIG. 1.

As can be seen from FIG. 1, the prime mover 23 drives into the steering differentials 21, 22 via the first input shafts 23a, 23b and the respective ring gears 21c, 22c. When the vehicle drives in a straight line, the prime mover 23 drives exclusively, the driving torque thereof being distributed to the two driven shafts 25a, 25b via the steering differentials 21, 22.

During synchronous running of the two driven shafts 25a, 25b, the clutch element 24 is stationary or behaves in a neutral manner. When the vehicle corners, a differential torque is generated by the drives 11a, 11b of the steering drive system 10, and this differential torque acts on the steering differentials 21, 22 via the drive connection devices 14, 15, via the summing gear unit 12, the toothed wheel 16 arranged on the output shaft 13c of the summing gear unit 12, the clutch element 24 and toothed wheels 26, 27, 28 arranged thereon, and generates different torques at the driven shafts 25a, 25b. The different torques at the driven shafts 25a, 25b generate a yaw moment which results in different speeds at the driven shafts 25a, 25b and a cornering movement of the vehicle.

The drives 11a, 11b of the steering drive system 10 are summed by the summing gear unit 12 in common on the output shaft 13c and, therefore, on the toothed wheel 16 arranged thereon. In so doing, the two input shafts 13a, 13b of the summing gear unit 12 are mutually supported by one another with respect to torque.

In the event of failure of one of the drives 11a, 11b, this mutual torque-related support is canceled. In so doing, the load direction at the respective worm drive 14a or 15a changes direction, and this change in direction is automatically blocked by the self-locking effect of the worm drive 14a, 15a.

Due to the fixing of one of the input shafts 13a, 13b of the summing gear unit 12, the latter is functionally transformed into a reduction gear unit for the drive 11a or 11b that is still functioning. As a result of the gear ratio conditions in the summing gear unit 12, the toothed wheel 16 of the output shaft 13c of the summing gear unit 12, which toothed wheel 16 is drivingly connected to the clutch element 24, is still acted upon by the same nominal torque in spite of the failure of one of the drives 11a, 11b.

Accordingly, the vehicle, which possibly needs a high yaw moment to overcome the transverse resistance forces, remains steerable. The failure of one of the drives 11a, 11b of the steering drive system 10 can possibly lead to a reduction in the achievable steering performance, but the vehicle remains steerable.

A firm braking of the inoperative drive 11a or 11b can also be ensured in addition to or as an alternative to the respective worm drive 14a, 15a by the respective braking device 14b or 15b (if provided). In addition, according to embodiment forms of the invention, secondary states of the drives 11a, 11b, e.g., a pressure drop in an inoperative hydrostatic drive 11a or 11b or the respective speeds and differential speed thereof (as described above), can be used as braking initiators.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A steering drive system for a skid steer vehicle, comprising:
   a drive arrangement having a first drive and a second drive;
   a summing gear unit having a first input shaft, a second input shaft, and an output shaft, the summing gear unit summing respective drive torques of the first and second drives on the output shaft;
   a first drive connection device drivingly connecting the first drive to the first input shaft of the summing gear unit; and
   a second drive connection device drivingly connecting the second drive to the second input shaft of the summing gear unit,
   wherein each of the first and second drive connection devices is configured such that driving torque directed toward the first and second drives from the summing gear unit is prevented from being transmitted to the first and second drives during a continuously produced drive connection between the first and second drives and the summing gear unit,
   wherein the first and second drive connection devices are self-locking for driving torques directed from the summing gear unit to the first and second drives.

2. The steering drive system of claim 1, wherein the summing gear unit is a planetary gear unit.

3. The steering drive system of claim 2, wherein the first input shaft of the summing gear unit is drivingly connected to a planet carrier of the summing gear unit, wherein the second input shaft of the summing gear unit is drivingly connected to a sun gear of the summing gear unit, and the output shaft of the summing gear unit is drivingly connected to a ring gear of the summing gear unit.

4. A steering drive system for a skid steer vehicle, comprising:
a drive arrangement having a first drive and a second drive;
a summing gear unit having a first input shaft, a second input shaft, and an output shaft, the summing gear unit summing respective drive torques of the first and second drives on the output shaft;
a first drive connection device drivingly connecting the first drive to the first input shaft of the summing gear unit; and
a second drive connection device drivingly connecting, the second drive to the second input shaft of the summing gear unit,
wherein each of the first and second drive connection devices is configured such that driving torque directed toward the first and second drives from the summing gear unit is prevented from being transmitted to the first and second drives during a continuously produced drive connection between the first and second drives and the summing gear unit,
wherein each of the first and second drive connection devices have toothed elements.

5. A steering drive system for a skid steer vehicle, comprising:
a drive arrangement having a first drive and a second drive;
a summing gear unit having a first input shaft, a second input shaft, and an output shaft, the summing gear unit summing respective drive torques of the first and second drives on the output shaft;
a first drive connection device drivingly connecting the first drive to the first input shaft of the summing gear unit; and
a second drive connection device drivingly connecting the second drive to the second input shaft of the summing gear unit,
wherein each of the first and second drive connection devices is configured such that driving torque directed toward the first and second drives from the summing gear unit is prevented from being transmitted to the first and second drives during a continuously produced drive connection between the first and second drives and the summing gear unit,
wherein each of the first and second drive connection devices have a worm drive.

6. A steering drive system for a skid steer vehicle, comprising:
a drive arrangement having a first drive and a second drive;
a summing gear unit having a first input shaft, a second input shaft, and an output shaft, the summing gear unit summing respective drive torques of the first and second drives on the output shaft;
a first drive connection device drivingly connecting the first drive to the first input shaft of the summing gear unit; and
a second drive connection device drivingly connecting the second drive to the second input shaft of the summing gear unit,
wherein each of the first and second drive connection devices is configured such that driving torque directed toward the first and second drives from the summing gear unit is prevented from being transmitted to the first and second drives during a continuously produced drive connection between the first and second drives and the summing gear unit,
wherein each of the first and second drive connection devices have a screw drive.

7. A steering drive system for a skid steer vehicle, comprising:
a drive arrangement having a first drive and a second drive;
a summing gear unit having a first input shaft, a second input shaft, and an output shaft, the summing gear unit summing respective drive torques of the first and second drives on the output shaft;
a first drive connection device drivingly connecting the first drive to the first input shaft of the summing gear unit; and
a second drive connection device drivingly connecting the second drive to the second input shaft of the summing gear unit,
wherein each of the first and second drive connection devices is configured such that driving torque directed toward the first and second drives from the summing gear unit is prevented from being transmitted to the first and second drives during a continuously produced drive connection between the first and second drives and the summing gear unit,
wherein each of the first and second drive connection devices have an epicyclic gear unit.

8. A steering drive system for a skid steer vehicle, comprising:
a drive arrangement having a first drive and a second drive;
a summing gear unit having a first input shaft, a second input shaft, and an output shaft, the summing gear unit summing respective drive torques of the first and second drives on the output shaft;
a first drive connection device drivingly connecting the first drive to the first input shaft of the summing gear unit; and
a second drive connection device drivingly connecting the second drive to the second input shaft of the summing gear unit,
wherein each of the first and second drive connection devices is configured such that driving torque directed toward the first and second drives from the summing gear unit is prevented from being transmitted to the first and second drives during a continuously produced drive connection between the first and second drives and the summing gear unit,
wherein the first drive connection device has a first braking device configured to brake a drivetrain of the first drive, and the second drive connection device has a second braking device configured to brake a drivetrain of the second drive, the steering drive system further comprising speed detectors detecting respective driving speeds of the first and second drives, the first and second braking devices being selectively activatable based on the detected driving speeds and differential speed determined therefrom.

9. The steering drive system of claim 8, wherein the speed detectors are arranged in the summing gear unit.

10. A skid steer vehicle comprising:
a steering drive system having:
a drive arrangement having a first drive and a second drive;
a summing gear unit having a first input shaft, a second input shaft, and an output shaft, the summing gear unit summing respective drive torques of the first and second drives on the output shaft;
a first drive connection device drivingly connecting the first drive to the first input shaft of the summing gear unit
a second drive connection device drivingly connecting the second drive to the second input shaft of the summing gear unit, wherein each of the first and second drive connection devices is configured such that driving torque directed toward the first and second drives from the summing gear unit is prevented from being transmitted to the first and second drives during a continuously produced drive connection between the first and second drives and the summing gear unit;

a first steering differential;

a second steering differential;

a prime mover configured to provide a translational drive of the vehicle; and a clutch element, wherein the prime mover is connected to both the first and second steering differentials, and the clutch element is connected to both the first and second steering elements and also to the summing gear unit.

11. The skid steer vehicle of claim 10, wherein the first and second steering differentials and the steering drive system cooperate such that the clutch element behaves in a neutral manner and does not influence the speed of the first and second steering differentials when the vehicle travels in a straight line.

12. The skid steer vehicle of claim 11, wherein the clutch element comprises a zero shaft, each of the first and second steering differentials are formed by a respective planetary gear unit, and the zero shaft is stationary when the vehicle travels in a straight line.

* * * * *